United States Patent
Walker et al.

(10) Patent No.: US 7,566,873 B1
(45) Date of Patent: Jul. 28, 2009

(54) HIGH-RESOLUTION, LOW-DISTORTION AND HIGH-EFFICIENCY OPTICAL COUPLING IN DETECTION SYSTEM OF ELECTRON BEAM APPARATUS

(75) Inventors: David Walker, Livermore, CA (US);
Salam Harb, Los Gatos, CA (US);
Vassil Spasov, San Jose, CA (US);
David Stites, St. Petersburg, FL (US);
Izzy Lewis, San Jose, CA (US); Marian Mankos, Palo Alto, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 459 days.

(21) Appl. No.: 11/638,805

(22) Filed: Dec. 14, 2006

Related U.S. Application Data

(60) Provisional application No. 60/859,748, filed on Nov. 17, 2006.

(51) Int. Cl.
*G01N 23/00* (2006.01)
*G21K 7/00* (2006.01)

(52) U.S. Cl. .............. 250/310; 250/306; 250/307; 250/311; 250/492.1; 250/396 R; 250/336.2; 250/358.1; 250/360.1; 850/9; 850/11

(58) Field of Classification Search ............ 250/306, 250/307, 310, 311, 492.1, 396 R, 336.2, 358.1, 250/360.1; 850/9, 11
See application file for complete search history.

(56) References Cited

U.S. PATENT DOCUMENTS

| | | | |
|---|---|---|---|
| 5,319,207 A | 6/1994 | Rose et al. | |
| 6,586,733 B1 | 7/2003 | Veneklasen et al. | |
| 6,803,571 B1 | 10/2004 | Mankos | |
| 6,803,572 B2 | 10/2004 | Veneklasen et al. | |
| 6,878,937 B1 * | 4/2005 | Mankos ............... | 850/9 |
| 7,009,177 B1 | 3/2006 | Mankos et al. | |
| 2004/0173762 A1 | 9/2004 | Hatakeyama et al. | |

OTHER PUBLICATIONS

R.M. Tromp "Low-energy electron microscopy", IBM J. Res. Develop., Jul. 2000, pp. 503-516, vol. 44, No. 4.
V. Kolarik, et al. "Close packed prism arrays for electorn microscopy", Optik 87, No. 1 (1991), pp. 1-12.
H. Rose, et al. "Outline of a versatile corrected LEEM", Optik 92, No. 1 (1992), pp. 31-44.
E. Bauer "Low energy electron microscopy", 1994, pp. 895-938, Rep. Prog. Phys. 57, IOP Publishing Ltd.

\* cited by examiner

*Primary Examiner*—Jack I Berman
*Assistant Examiner*—Meenakshi S Sahu
(74) *Attorney, Agent, or Firm*—Okamoto & Benedicto LLP

(57) ABSTRACT

One embodiment relates to an apparatus for inspecting a substrate using charged particles. The apparatus includes an illumination subsystem, an objective subsystem, a projection subsystem, and a beam separator interconnecting those subsystems. The apparatus further includes a detection system which includes a scintillating screen, a detector array, and an optical coupling apparatus positioned therebetween. The optical coupling apparatus includes both refractive and reflective elements. Other embodiments and features are also disclosed.

21 Claims, 5 Drawing Sheets

HIGH-RESOLUTION, LOW-DISTORTION AND HIGH-EFFICIENCY OPTICAL COUPLING IN DETECTION SYSTEM OF ELECTRON BEAM APPARATUS

CROSS-REFERENCE TO RELATED APPLICATION

The present application claims the benefit of U.S. Provisional Patent Application No. 60/859,748, entitled "High-Resolution, Low-Distortion and High-Efficiency Optical Coupling In Detection System Of Electron Beam Apparatus", filed Nov. 17, 2006, by inventors David Walker, Salam Harb, Vassil Spasov, David Stites, Izzy Lewis, and Marian Mankos, the disclosure of which is hereby incorporated by reference.

BACKGROUND OF THE INVENTION

1. Field of the Invention

The present invention relates to apparatus and methods for inspection or review of substrates, such as, for example, semiconductor wafers and masks.

2. Description of the Background Art

Emission electron microscopes include low energy emission microscopes (LEEM), photo-electron emission microscopes (PEEM), and secondary electron emission microscopes (SEEM). LEEM imaging systems detect electrons reflecting or mirroring off of the surface of a flat substrate. PEEM imaging systems detect photoelectrons emitted from a surface of a substrate. SEEM imaging systems detect secondary electrons emitted from a surface of a substrate It is desirable to improve emission electron microscope systems, including those utilized for the automated inspection or review of substrate surfaces. More particularly, it is desirable to improve pixel alignment and image resolution in emission electron microscope systems.

SUMMARY

One embodiment relates to an apparatus for inspecting a substrate using charged particles. The apparatus includes an illumination subsystem, an objective subsystem, a projection subsystem, and a beam separator interconnecting those subsystems. The apparatus further includes a detection system which includes a scintillating screen, a detector array, and an optical coupling apparatus positioned therebetween. The optical coupling apparatus includes both refractive and reflective elements.

Other embodiments and features are also disclosed.

DETAILED DESCRIPTION

LEEM Imaging System

Figure 1:
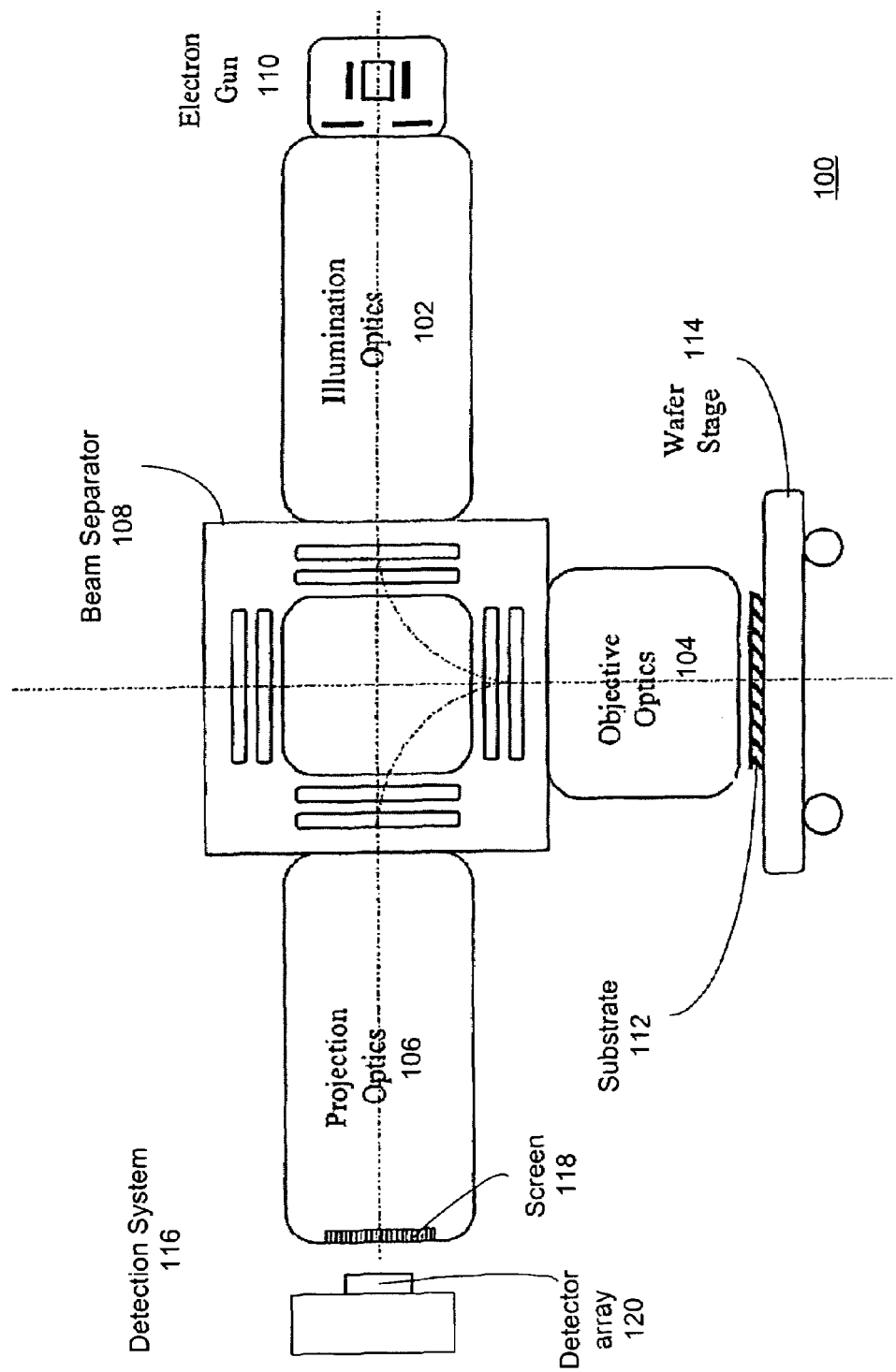
FIG. 1 is a schematic diagram depicting an apparatus for inspecting a substrate using charged particles in accordance with an embodiment of the invention.

FIG. 1 is a schematic diagram depicting an apparatus 100 for inspecting a substrate using charged particles in accordance with an embodiment of the invention. The apparatus 100 includes illumination electron-optics 102, objective electron-optics 104, projection electron-optics 106, and a beam separator 108. The beam separator 108 is coupled to and interconnects the illumination electron-optics 102, the objective electron-optics 104, and the projection electron-optics 106. For simplicity, the electron-optics may be referred to as simply "optics," though they operate on electrons.

The illumination optics 102 is configured to receive and collimate charged particles from a charged-particle source. In a preferred embodiment, the charged particles comprise electrons, and the source comprises an electron gun 110. In a preferred embodiment, the illumination optics 102 comprises an arrangement of magnetic and/or electrostatic lenses configured to focus the charged particles from the source so as to generate an incident charged-particle beam. The specific details of the arrangement of lenses depend on specific parameters of the apparatus and may be determined by one of skill in the pertinent art.

The beam separator 108 is configured to receive the incident beam from the illumination optics 102 and to bend or deflect the incident beam by 90 degrees into the objective optics 104. In a preferred embodiment, the beam separator 108 comprises a magnetic prism array including a central magnetic section, an inner magnetic section outside the central section, and an outer magnetic section outside the inner section. One specific embodiment of the beam separator 108 is disclosed in U.S. Pat. No. 6,878,937, entitled "Prism array for electron beam inspection and defect review," by inventor Marian Mankos.

The objective optics 104 is configured to receive the incident beam from the beam separator 108 and to decelerate and focus the incident beam onto the substrate 112. The incident beam onto the substrate 108 causes reflection and/or emission of a scattered beam of charged particles. The scattered beam comprises a two-dimensional image of the illuminated area of the substrate 112.

The objective optics 104 is further configured to re-accelerate the scattered beam and to refocus the two-dimensional image of the substrate area. In a preferred embodiment, the objective optics 104 comprises an arrangement of magnetic and/or electrostatic lenses configured to focus and decelerate the incident beam to the substrate 112 and to retrieve and re-accelerate the scattered beam from the substrate 112.

In one implementation, to accomplish the deceleration and re-acceleration, the substrate may be maintained at a negative high voltage potential close to that of the incident beam source while the objective optics 104 is at ground potential. In an alternative arrangement, the substrate (and source) may be at ground potential and the objective optics (and other components) at a high voltage. Further specific details of the arrangement of lenses depend on specific parameters of the apparatus and may be determined by one of skill in the pertinent art.

The beam separator 108 is configured to receive the scattered beam from the objective optics 104 and to bend the scattered beam towards the projection optics 106. The projection optics 106 is configured to receive the scattered beam from the beam separator 108 and to magnify and project the scattered beam onto a detection system 116.

Direct Detection of Electrons by Detector Array

In one implementation (not illustrated), the detection system 116 may include charged-coupled device (CCD) array in the vacuum environment of the apparatus 100 so as to directly receive the projected electrons. Unfortunately, such an implementation has problems with radiation damage to the CCD array. Also, the sensor gain in converting incident electrons to electrons in the well is very large. This limits the amount of beam current, and thus limits the speed of the detection system.

Detection Using Scintillating Screen and Detector Array

To avoid such problems, in accordance with an embodiment of the invention, the detection system 116 may include a phosphorescent or scintillating screen 118. The screen 118 generates a light-based or optical image of the projected electrons. The optical image may then be transferred to a camera (not depicted in FIG. 1) or detector (sensor) array 120 (shown in FIG. 1). Preferably, the detector array may be a charge-coupled device (CCD) array which is part of a time-delay integration (TDI) detection system.

Coupling the Scintillating Screen to the Detector Array

Figure 2:
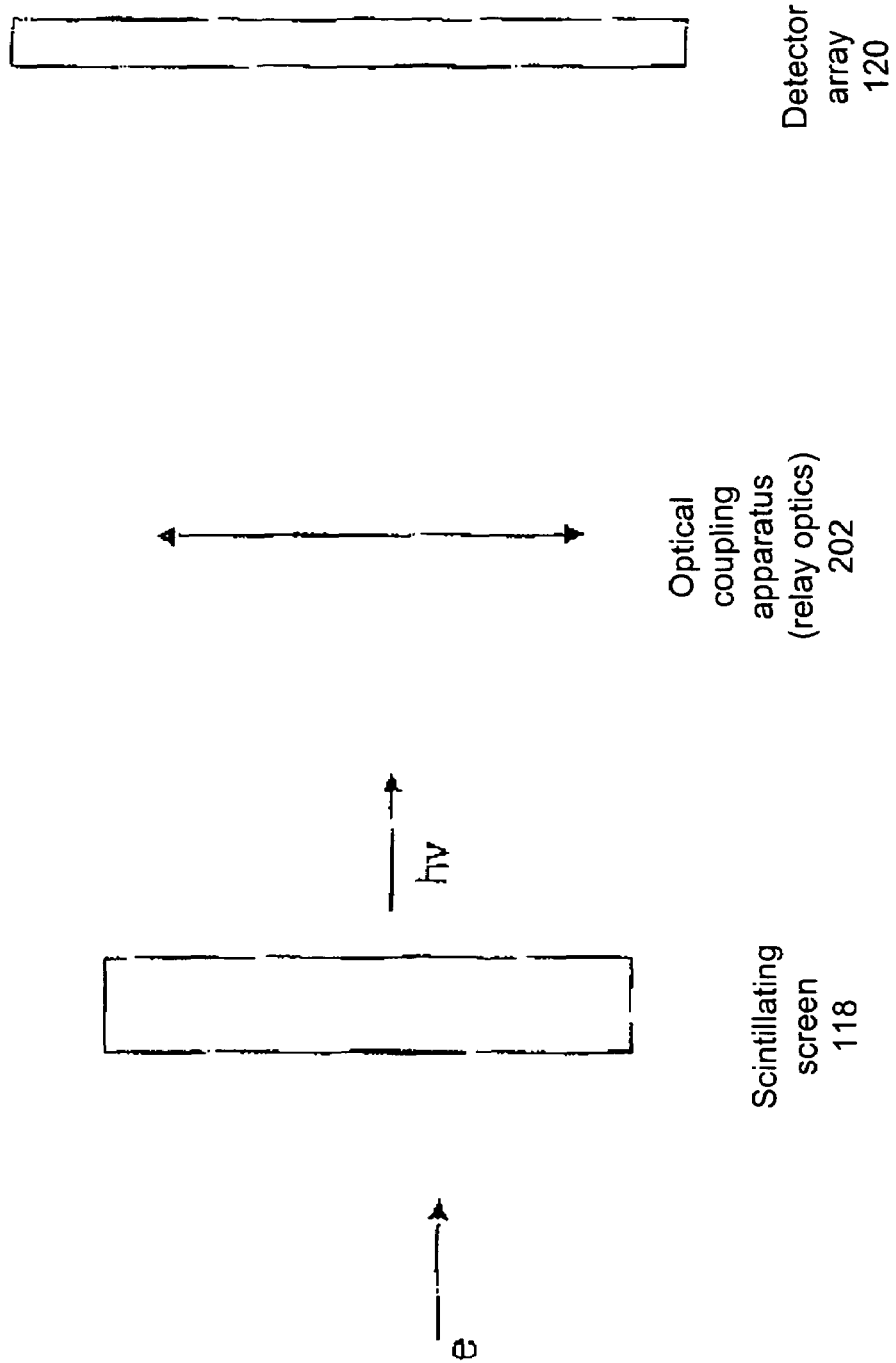
FIG. 2 is a high-level diagram illustrating a detection system including an optical coupling apparatus for coupling a scintillating screen to a detector array.

The optical image generated from the projected electrons by the scintillating screen 118 needs to be transferred to the detector array 120 by some type of coupling apparatus 202. FIG. 2 is a high-level diagram illustrating a detection system 116 including an optical coupling apparatus (relay optics) 202 for coupling a scintillating screen 118 to a detector array 120.

One type of optical coupling apparatus 202 that may be used is bonded fiber optics. This requires large, expensive fiber optics and would involve the difficult task of aligning the fiber optics to the TDI (CCD) pixels. In addition, the optical fibers typically degrade the image resolution.

Another type of optical coupling apparatus 202 that may be used is a refractive optical system which may include multiple refractive optical elements. Such a refractive optical system would be complex to manufacture with many refractive elements if high resolution and low distortion are to be achieved. Furthermore, such a refractive optical system has the disadvantage of typically achieving only a relatively low numerical aperture (NA).

Optical Coupling Apparatus with Both Refractive and Reflective Elements

In accordance with an embodiment of the invention, the optical coupling apparatus 202 includes both refractive and reflective elements. One embodiment of such a refractive/reflective (catadioptric) optical coupling apparatus is described further below in relation to FIGS. 3 and 4.

Figure 3:
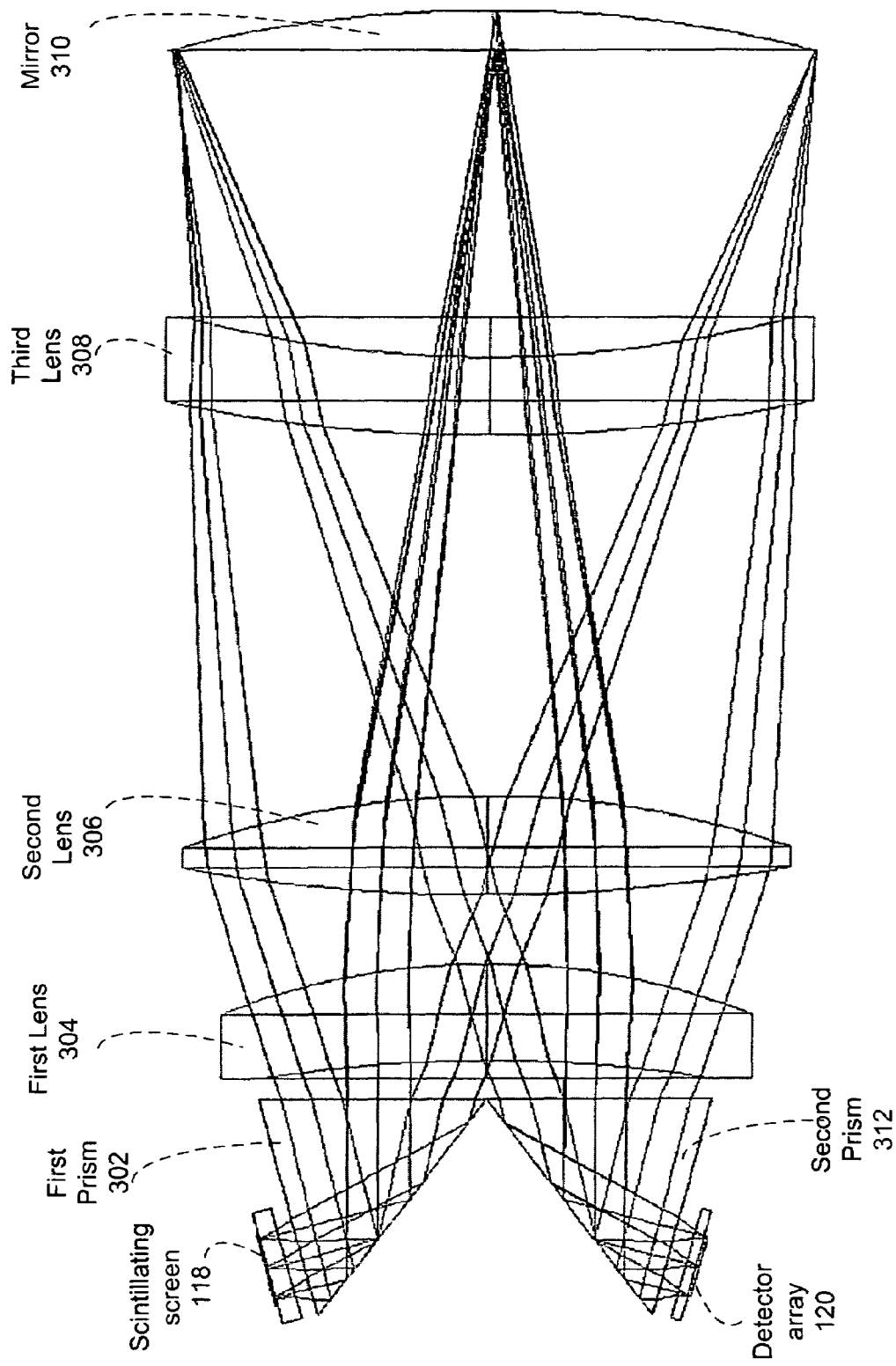
FIG. 3 is a side (cross-sectional) view of an apparatus for optically coupling a scintillating screen to a detector array in accordance with an embodiment of the invention.
Figure 4:
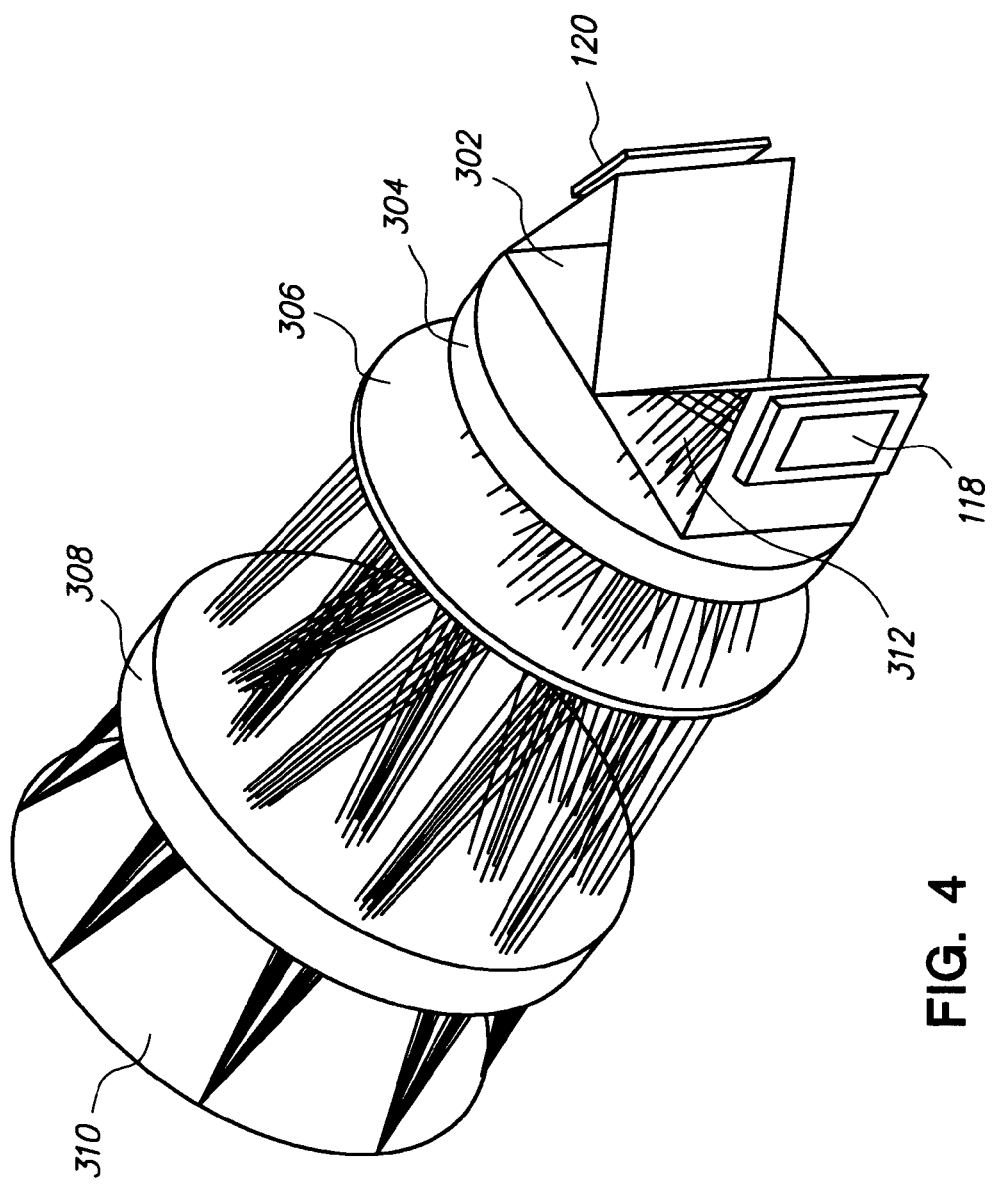
FIG. 4 is a three-dimensional depiction of an apparatus for optically coupling a scintillating screen to a detector array in accordance with an embodiment of the invention.

FIG. 3 is a side (cross-sectional) view and FIG. 4 is a three-dimensional (perspective) view of an apparatus 202 for optically coupling a scintillating screen 118 to a detector array 120 in accordance with an embodiment of the invention.

The scintillating screen 118 may be positioned at one end of an electrically conductive tube (not depicted) which is insulated from electrical ground. The tube may be used as a Faraday cup for calibration purposes. While the scintillating screen 118 is in a vacuum environment so as to receive the projected electrons, a transparent window and vacuum seal (not depicted) may be used to separate the vacuum environment from the optical coupling apparatus 202.

The scintillating screen 118 may be, for example, a YAG (yttrium aluminum garnet) scintillator, and the detector array 120 may be, for example, a CCD array which is part of a time-delay integration (TDI) detection system. The YAG scintillator may be, for example, one millimeter thick, and may be coated with ITO (indium tin oxide) or aluminum on its front side (facing the projection optics 106). An ITO layer provides conductivity so that the YAG does not build up electrical charge. An aluminum layer provides conductivity and also increases the light collection efficiency by reflecting the light towards the optical coupling apparatus (relay optics) 202.

In accordance with an embodiment of the invention, the optical coupling apparatus 202 includes both refractive and reflective elements. As shown, the refractive elements may include a first prism 302, a first lens 304, a second lens 306, a third lens 308, and a second prism 312. The lenses and prisms may be constructed of different types of glass. The reflective elements may include a mirror 310. In addition, the back surface of the prisms 302 and 312 may also serve as reflective elements. The illustrated embodiment provides 1× (one times) magnification and achieves an advantageously compact design by folding the light with the reflective elements such that the light is passed twice through each refractive element.

Light rays are shown in FIG. 3 from three points originating on the screen 118. The light rays are shown as they pass through the first prism 302 and then a first time through each of the three lenses (304, 306, and 308). The light rays are reflected by the mirror (310) such that they pass a second time (in reverse order) through each of the three lenses (308, 306, and 304). The light rays then pass through the second prism 312 such that they are focused onto three corresponding points on the detector array 120.

The refractive/reflective optical coupling apparatus described above in relation to FIGS. 3 and 4 provides at least the following advantages. (i) It provides a high-resolution image of the light from the scintillating screen 118 onto the detector array 120. The coupling apparatus described herein may be implemented to achieve a resolution of eight microns or less. (ii) It further achieves sufficiently small distortion so as to prevent blurring of the image on the detector array 120; in other words, the image on the detector array 120 is sharp. The coupling apparatus described herein may be implemented to achieve a distortion of less than 0.1%. (iii) Additionally, it provides a high numerical aperture which is required for high light collection efficiency to allow high-speed inspection. The coupling apparatus described herein may be implemented to achieve a numerical aperture of 0.4 or more. Continuous data collection during inspection of a semiconductor wafer or other substrate may be achieved by synchronizing the stage velocity and the clocking of the TDI detection system.

An optional feature that may be implemented is an intensity adjustment aperture. Such an aperture may be positioned, for example, in front of the mirror 310 of the optical coupling apparatus. The size of the opening of the aperture may then be controllably adjusted. The larger the opening, the greater the intensity detected at the detector array 120. The smaller the opening, the less the intensity detected at the detector array 120. Due to the design of the optical coupling apparatus, the intensity change would be applied uniformly or relatively uniformly across the detector array. Such an intensity adjusting aperture would not provide uniform intensity changes if fiber optic coupling were used, for example.

Figure 5:
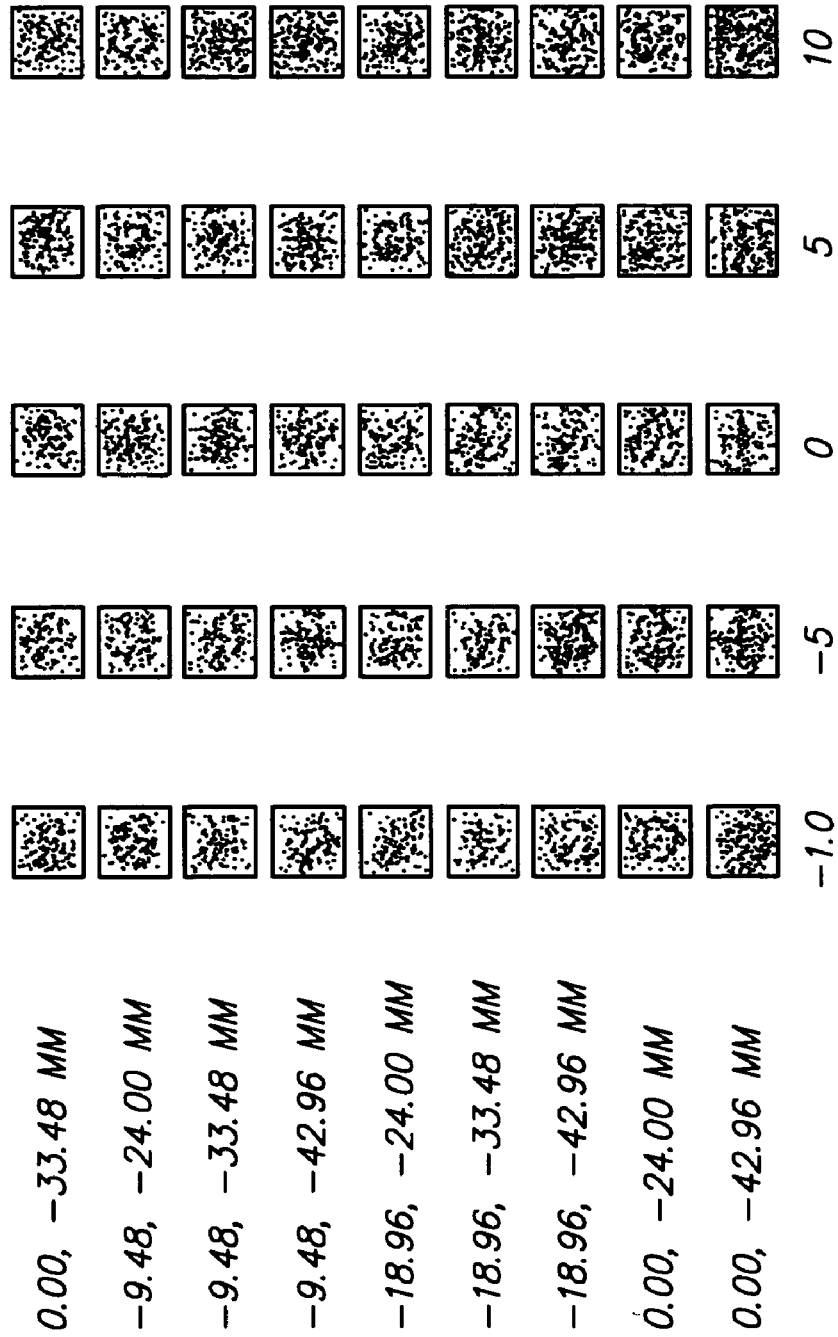
FIG. 5 is a through focus spot diagram based on the coupling apparatus using refractive and reflective elements in accordance with an embodiment of the invention.

FIG. 5 is a through focus spot diagram based on the optical coupling apparatus using refractive and reflective elements in accordance with an embodiment of the invention. The through focus spot diagram shows a simulated surface image at the CCD array. As seen from FIG. 5, the optical coupling apparatus couples the scintillating screen 118 to the detector array 120 with a low distortion.

The above-described diagrams are not necessarily to scale and are intended be illustrative and not limiting to a particular implementation. The above-described invention may be used in an automatic inspection or review system and applied to the inspection or review of optical or X-ray masks and similar substrates in a production environment.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. An apparatus for inspecting a substrate using an electron beam, the apparatus comprising:
   an electron source and illumination electron-optics configured to generate an incident electron beam;
   objective electron-optics configured to receive the incident beam, to focus the incident beam onto the substrate, and to retrieve an emitted beam from the substrate;
   projection electron-optics configured to receive the emitted beam and to provide a projected beam;
   a beam separator coupled to and interconnecting the illumination electron-optics, the objective electron-optics, and the projection electron-optics; and
   a detection system configured to receive the projected beam and which includes a scintillating screen, a detector array, and an optical coupling apparatus positioned therebetween, wherein the optical coupling apparatus includes both refractive and reflective elements.

2. The apparatus of claim 1, wherein the detection system comprises a time-delay integration (TDI) detection system.

3. The apparatus of claim 1, wherein said elements include a plurality of refractive lenses.

4. The apparatus of claim 1, wherein said elements include at least one mirror.

5. The apparatus of claim 1, wherein said elements include a plurality of prisms.

6. The apparatus of claim 1, wherein the resolution of the optical coupling apparatus is eight microns or less.

7. The apparatus of claim 1, wherein the numerical aperture of the optical coupling apparatus is 0.4 or more.

8. The apparatus of claim 1, wherein the distortion of the optical coupling apparatus is 0.1% or less.

9. The apparatus of claim 1, wherein said elements include two prisms, three lenses and one mirror.

10. The apparatus of claim 9, wherein light from a point on the scintillating screen passes through a first prism, passes through each of the three lenses, reflects from the mirror, passes again through each of the three lenses in reverse order, passes through the second prism, and is focused on a corresponding point on the detector array.

11. The apparatus of claim 10, wherein the resolution of the optical coupling apparatus is eight microns or less, the numerical aperture of the optical coupling apparatus is 0.4 or more, and the distortion of the optical coupling apparatus is 0.1% or less.

12. The apparatus of claim 1, further comprising an intensity adjustment aperture within the optical coupling apparatus.

13. A method of inspecting a substrate using electrons, the method comprising:
   generating an incident electron beam;
   bending the incident beam through a prism array;
   focusing and decelerating the incident beam such that the incident beam impinges on a substrate at a second tilt angle;
   retrieving an emitted electron beam;
   bending the emitted beam through the prism array;
   projecting the emitted beam to provide a projected beam;
   receiving the projected beam on a scintillating screen; and
   coupling light from the scintillating screen to a detector array using an optical coupling apparatus having refractive and reflective elements.

14. The method of claim 13, further comprising synchronizing clocking of the detector array and translation of the substrate.

15. The method of claim 13, wherein said elements include two prisms, multiple lenses, and a mirror.

16. The method of claim 13, wherein light from a point on the scintillating screen passes through a first prism, passes through the multiple lenses, reflects from the mirror, passes again through the multiple lenses in reverse order, passes through the second prism, and is focused on a corresponding point on the detector array.

17. An electron beam apparatus comprising a detection system which is configured to receive a projected electron beam and which is further configured to include a scintillating screen, a detector array, and an optical coupling apparatus positioned therebetween, wherein the optical coupling apparatus includes both refractive and reflective elements.

18. The apparatus of claim 17, wherein light from a point on the scintillating screen passes through a first prism, passes through multiple lenses, reflects from a mirror, passes again through the multiple lenses in reverse order, passes through a second prism, and is focused on a corresponding point on the detector array.

19. The apparatus of claim 17, further comprising an intensity adjustment aperture within the optical coupling apparatus.

20. A method performed in a detection system of an electron beam apparatus, the method comprising coupling light from a scintillating screen to a detector array using an optical coupling apparatus having refractive and reflective elements.

21. The method of claim 20, wherein light from a point on the scintillating screen passes through a first prism, passes through multiple lenses, reflects from a mirror, passes again through the multiple lenses in reverse order, passes through a second prism, and is focused on a corresponding point on the detector array.

* * * * *